Aug. 14, 1928.
J. F. O'CONNOR
1,680,337
FRICTION SHOCK ABSORBING MECHANISM
Filed Feb. 28, 1927   2 Sheets-Sheet 2
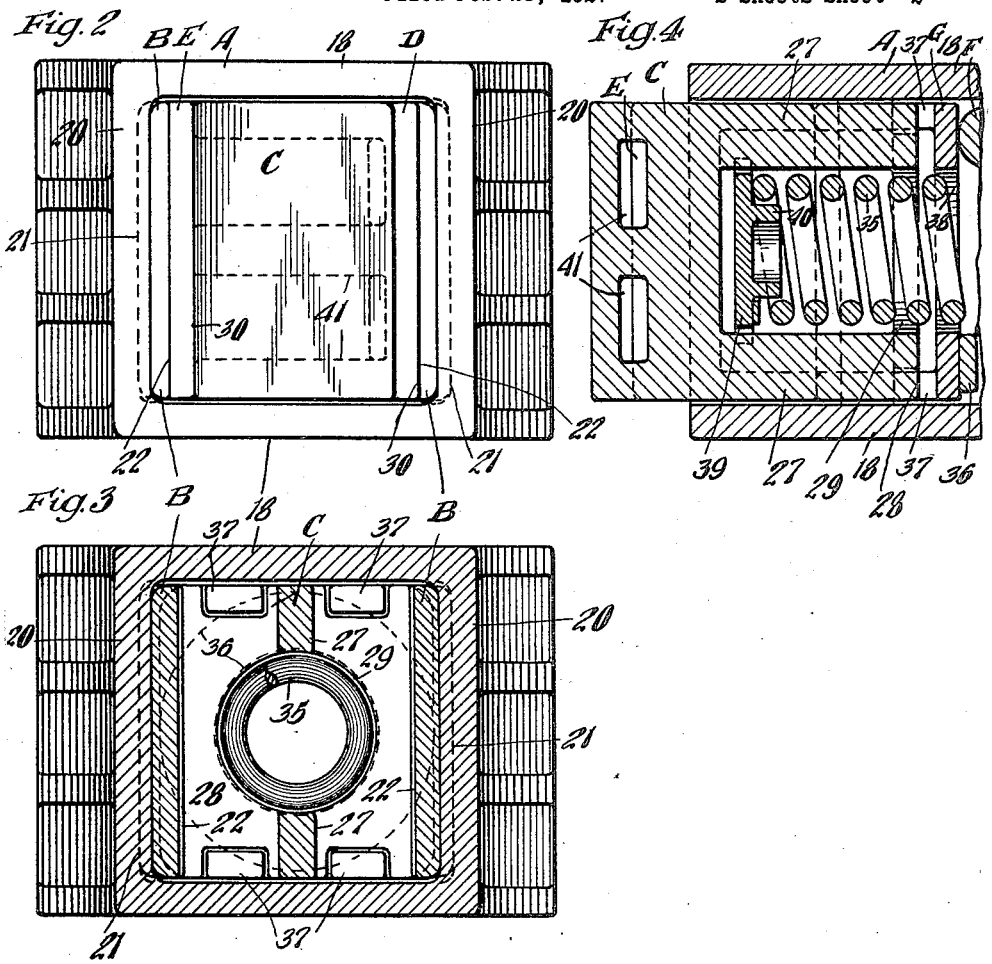
Witness
Wm. Geiger
Inventor
John F. O'Connor
By George J. Haight
Atty Patented Aug. 14, 1928.

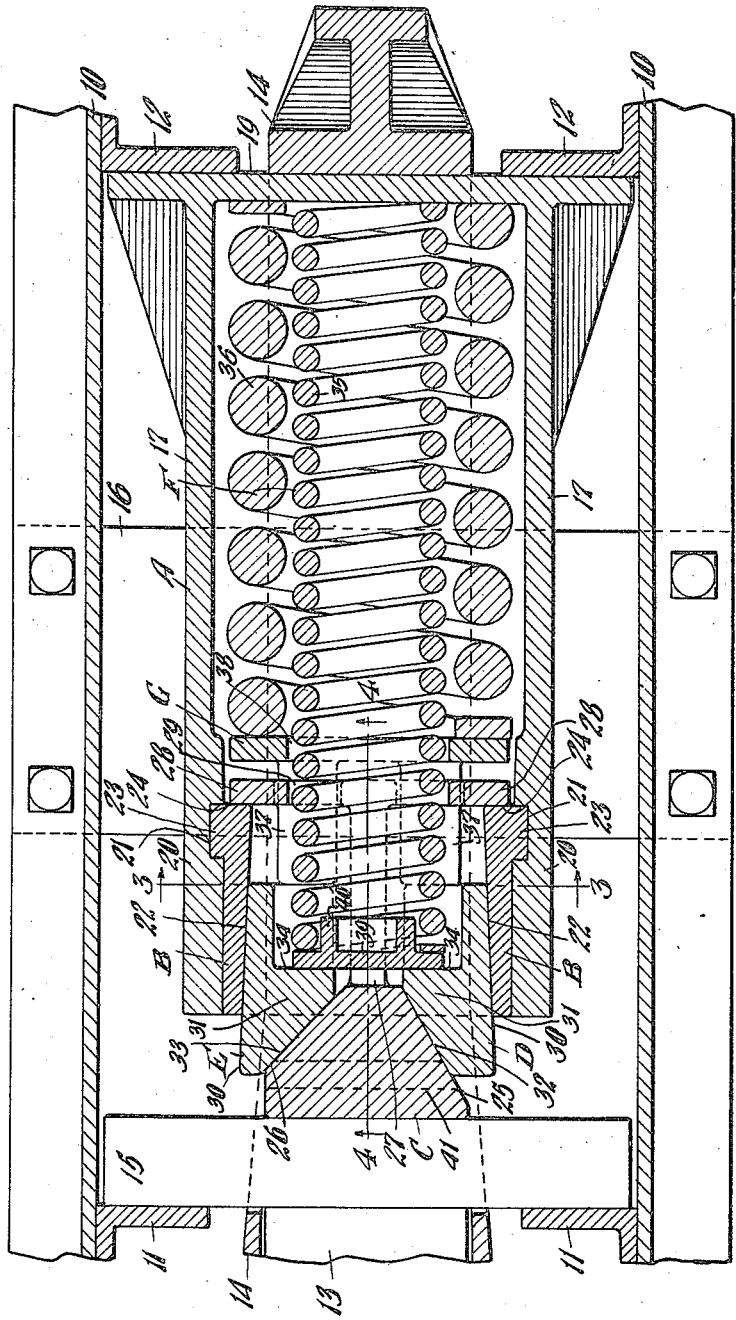

1,680,337

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 28, 1927. Serial No. 171,407.

This invention relates to improvements in friction shock absorbing mechanisms.

One object of the invention is to provide a friction shock absorbing mechanism especially adapted for railway draft riggings, including a cage provided with detachable liners interlocked with the cage, friction means co-operating with the liners, wherein the friction system includes a wedge held assembled with the mechanism and against outward movement by means of rugged construction interlocked with the liners.

Another object of the invention is to provide a friction shock absorbing mechanism of the character indicated, including a spring cage having detachable liners interlocked therewith, friction shoes engaging the liners and a wedge having engagement with the shoes, wherein the parts are held assembled by the wedge which has means rigid therewith engaging abutment faces on the liners to limit outward movement of the wedge and wherein the liners are held interlocked with the cage by the spreading action of the wedge.

A further object of the invention is to provide a friction shock absorbing mechanism, including a spring cage having friction surfaces at the outer end thereof, friction shoes co-operating with the friction surfaces, wedge means co-operating with the shoes and a spring resistance comprising an inner and an outer coil resisting movement of the shoes, wherein the outer coil co-operates with the inner ends of the shoes and the inner coil is of greater length than the outer coil and extends beyond the same, having bearing on the shoes near their outer ends.

Other objects of the invention will more fully and clearly appear from the description and claims hereinafter following.

In the drawings, forming a part of this specification, Figure 1 is a horizontal longitudinal, sectional view of a portion of a railway draft rigging, showing my improvements in connection therewith. Figure 2 is a front end elevational view of the shock absorbing mechanism proper illustrated in Figure 1. Figure 3 is a transverse vertical sectional view corresponding substantially to the line 3—3 of Figure 1 and Figure 4 is a longitudinal vertical sectional view of the front end portion of the shock absorbing mechanism corresponding substantially to the line 4—4 of Figure 1.

In said drawings, 10—10 indicate channel-shaped center or draft sills of a railway car underframe, to the inner sides of which are secured the usual front stop lugs 11—11 and rear stop lugs 12—12. The inner end of the draw-bar is indicated by 13, to which is operatively connected a yoke 14 of well known form. The shock absorbing mechanism proper and a front main follower 15 are disposed within the yoke, and the yoke and the parts therewithin are supported in operative position by a detachable saddle plate 16 secured to the draft sills.

The improved shock absorbing mechanism proper, as shown, comprises broadly: A spring cage A; a pair of liners B—B; a wedge block C; two friction shoes D and E; a main spring resistance F; and a spring follower G.

The spring cage A is in the form of a substantially rectangular box-like casting provided with longitudinally extending vertical spaced side walls 17—17, horizontally extending spaced top and bottom walls 18—18, and a transverse vertical rear end wall 19. The rear end wall 19 is extended laterally beyond the side walls of the cage, as most clearly shown in Figures 1, 2 and 3, and co-operates with the rear stop lugs 12 in the manner of the usual rear follower. The side walls 17 at the forward end of the cage are thickened as indicated at 20, and are provided with interior vertically disposed grooves 21 inwardly of the front end of the cage.

The liners B are disposed at opposite sides of the cage, each liner being in the form of a heavy rectangular plate. The two liners B are of similar design, each being provided with a longitudinally extending flat friction surface 22 on the inner side thereof, the friction surface 22 being inclined with respect to the longitudinal axis of the mechanism and the opposed surfaces 22 of the two liners converging inwardly of the cage. At the rear end, each liner is provided with a relatively wide vertical rib or flange 23 on the outer side thereof, fitting within the groove 21 on the corresponding side wall of the spring cage. It will be evident that the interlocking ribs 23 and grooves 21 anchor the liners to the cage against longitudinal movement. The liners B project inwardly beyond the side walls 17 of the cage, thus presenting flat end faces 24 acting as abutment means for a purpose hereinafter described.

The wedge C is in the form of a block having a flat front end face bearing directly on the inner side of the main follower 15. At the inner end, the wedge block C is provided with a pair of inwardly converging faces 25 and 26, the face 25 being disposed at a relatively keen wedge-acting angle with respect to the longitudinal axis of the mechanism and the face 26 being disposed at a relatively blunt angle with respect to said axis. The wedge block C is also provided with a rearwardly extending pair of arms 27—27 spaced apart vertically to accommodate the inner coil of the main spring resistance F therebetween. At their rear ends, the arms 27 carry an integral plate-like section 28 of such a width as to engage behind the liners B. The plate-like section 28 is provided with a central opening 29 which freely accommodates the front end of the inner coil of the spring resistance F. It will be evident that the plate-like section 28 is held against outward movement by engagement with the abutment faces 24 on the liners, but is free to move inwardly of the cage.

The friction shoes D and E are disposed at opposite sides of the mechanism and are interposed between the wedge C and the liners B. The two shoes are of similar design except as hereinafter pointed out, each having a longitudinally disposed flat outer friction surface 30 adapted to co-operate with the friction surface 22 of the corresponding liner B. On the inner side, each shoe is provided with a lateral enlargement 31 having a wedge face on the front side thereof co-operating with the corresponding wedge face of the block C. The wedge face of the shoe D is designated by 32 and co-operates with the wedge face 25 of the block C and is correspondingly inclined thereto, and the wedge face of the shoe E is designated by 33 and co-operates with the wedge face 26 of the block C, being correspondingly inclined thereto. The inner ends of the enlargements 31 of the shoes D and E present flat transverse abutment faces 34.

The main spring resistance F comprises an inner relatively light coil 35 and an outer heavier coil 36. Both of the coils 35 and 36 have their rear ends bearing on the end wall 19 of the cage A. The forward end of the coil 36 bears directly on the spring follower G which has top and bottom forwardly projecting sets of arms 37—37, engaging the inner ends of the friction shoes D and E. The arms 37 of each set are spaced apart as shown most clearly in Figure 3, and straddle the arms 27. The plate-like section 28 of the anchoring means of the wedge block C is recessed at the top and bottom as shown in Figure 3, to freely accommodate the arms 37.

The spring follower G is provided with a central opening 38 freely accommodating the coil of the inner spring 35 which extends through the follower and has the forward end thereof bearing on an auxiliary spring follower 39, the latter being in the form of a disk having the front face thereof bearing on the shoulders 34 of the shoes D and E. The spring follower 39 is preferably provided with an annular flange 40 rearwardly projecting therefrom and engaging within the coil of the spring 35 to prevent relative displacement of the spring follower and coil. When the parts are assembled, both the springs 35 and 36 are held under a predetermined initial compression, thereby maintaining the shoes in their outermost position and holding the same in engagement with the liners B. Compensation for wear of the various friction and wedge faces is had by the expansive action of the main spring F, which, as stated, is under initial compression. A certain amount of clearance, as shown in Figure 1, is provided between the spring follower G and the plate-like section 28 of the anchoring means for the wedge to permit sufficient relative movement of the parts to compensate for wear.

In assembling the mechanism, the main spring resistance F comprising the coils 35 and 36, the spring follower G, the shoes D and E, and the wedge C are inserted within the cage. A pair of bars are inserted through the transverse openings 41—41 provided for this purpose and most clearly shown in Figure 4, the bars engaging the outer ends of the friction shoes. With the bars thus engaging the shoes, the mechanism is compressed to a sufficient extent so that the liners B may be inserted. Inasmuch as the shoes D and E are held in their inner position by the bars inserted in the wedge, there is no wedging action between the wedge and the shoes during this compression and the shoes may be moved inwardly toward the axis of the mechanism a sufficient distance to permit the flanges or ribs 23 of the liners B to pass between the shoes and the side walls 17 of the cage. When the liners have been fully inserted, and the ribs thereof engaged within the grooves 21 on the side walls of the cage, the bars are removed from the wedge and the entire mechanism is permitted to expand, thereby forcing the friction shoes and wedge outwardly until movement of the wedge is limited by the section 28 of the anchoring means. Due to the expansive action of the spring resistance F, the wedge block C will hold the shoes separated and pressed against the liners, thereby retaining the liners interlocked with the cage, the liners in turn holding the wedge against outward movement by engagement with the section 28 of the anchoring means.

The operation of my improved shock absorbing mechanism, assuming a compression stroke, is as follows: The follower 15 and the cage A will be moved relatively toward each other, thereby forcing the wedge inwardly of the cage, carrying the friction shoes therewith and pressing the same into intimate frictional contact with the friction surfaces of the liners B. This action will continue either until the actuating force is reduced or movement of the main follower 15 is limited by engagement with the outer end of the cage A, whereupon the actuating force will be transmitted directly through the cage, the latter acting as a solid column load transmitting member for preventing the springs from being unduly compressed. In release, when the actuating pressure is reduced, the spring resistance F will force the friction shoes and wedge block outwardly until the movement of the wedge block is positively limited by engagement of the anchoring means thereof with the inner ends of the liners B.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage having opposed interior liners at the outer end thereof, said liners presenting interior opposed friction surfaces; of interengaging means on the liners and cage for detachably connecting the liners to the cage and locking the liners against longitudinal movement with respect to the cage; friction shoes cooperating with the friction surfaces of the liners; a wedge member engaging the shoes for spreading the same apart against the liners to hold the liners interlocked with the cage; means rigid with the wedge member engaging the inner ends of the liners for anchoring the wedge to the cage and limiting outward movement of the wedge; and spring resistance means within the cage opposing movement of the shoes.

2. In a friction shock absorbing mechanism, the combination with a rectangular spring cage; of a pair of liners interlocked with two opposed side walls of the cage; a block having inner wedge faces, said wedge block having an extension rigid therewith engaging behind the liners to anchor the wedge to the cage and limit outward movement of the wedge block; friction shoes interposed between the wedge block and the liners and limited in their outward movement by the wedge block; and a spring resistance within the cage, said spring resistance yieldingly opposing inward movement of the shoes and holding the shoes in engagement with the wedge block, thereby subjecting the liners to lateral outward pressure to hold the same assembled with the cage.

3. In a friction shock absorbing mechanism, the combination with a spring cage having a friction shell section and provided with interior shoulders; of friction-shoes cooperable with said shell; a spring resistance for yieldingly opposing relative movement of the shoes and shell during a compression stroke; and a wedge cooperable with said shoes, said wedge having a rigidly formed inward extension normally engaging with said interior shoulders to thereby limit the outward movement of the wedge with respect to the cage.

4. In a friction shock absorbing mechanism, the combination with a friction shell provided with detachable interior wall sections having stop means thereon; of friction means cooperating with the shell, said means including a spreading member for holding the friction means against the wall sections and pressing the wall sections outwardly to hold the same interlocked with the shell against longitudinal movement relatively thereto; spring resistance within the shell; a spring follower interposed between the spring resistance and shoes; and means normally spaced from said spring follower, engaging behind the stop means for holding the wedge assembled with the shell and limiting outward movement of the wedge.

In witness that I claim the foregoing I have hereunto subscribed my name this 23rd day of February, 1927.

JOHN F. O'CONNOR.